US011528325B2

(12) United States Patent
Hasegawa et al.

(10) Patent No.: US 11,528,325 B2
(45) Date of Patent: Dec. 13, 2022

(54) PRIORITIZING DATA USING RULES FOR TRANSMISSION OVER NETWORK

(71) Applicant: NIPPON TELEGRAPH AND TELEPHONE CORPORATION, Tokyo (JP)

(72) Inventors: Keita Hasegawa, Tokyo (JP); Takuma Koyama, Tokyo (JP); Yasushi Okano, Tokyo (JP); Masashi Tanaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/281,539

(22) PCT Filed: Oct. 10, 2019

(86) PCT No.: PCT/JP2019/040113
§ 371 (c)(1),
(2) Date: Mar. 30, 2021

(87) PCT Pub. No.: WO2020/075826
PCT Pub. Date: Apr. 16, 2020

(65) Prior Publication Data
US 2021/0368007 A1    Nov. 25, 2021

(30) Foreign Application Priority Data

Oct. 11, 2018  (JP) .............................. JP2018-192414

(51) Int. Cl.
*G06F 15/16*  (2006.01)
*H04L 67/12*  (2022.01)
*H04L 67/10*  (2022.01)

(52) U.S. Cl.
CPC .............. *H04L 67/12* (2013.01); *H04L 67/10* (2013.01)

(58) Field of Classification Search
CPC ................................ H04L 67/12; H04L 67/10
See application file for complete search history.

(56) References Cited

U.S. PATENT DOCUMENTS

2007/0153802 A1*  7/2007  Anke .................... H04L 47/125
                                                370/395.42
2009/0037034 A1*  2/2009  Mattingly .............. G07C 5/085
                                                701/3

(Continued)

FOREIGN PATENT DOCUMENTS

| JP | 2011022713 A | 2/2011 |
| JP | 2018-025865 A | 2/2018 |
| JP | 2018033793 A | 3/2018 |

OTHER PUBLICATIONS

Development of Automotive Intrusion Detection and Protection Systems against cyber-attack [online], Internet<URL: https://news.panasonic.com/jp/press/data/2017/10/jn171010-2/jn171010-2.html>.

(Continued)

*Primary Examiner* — Padma Mundur

(57) ABSTRACT

A device includes a memory; and a processor configured to execute first determining, for each data item generated in the device, a priority upon transmitting said each data item to an information processing apparatus, based on one or more rules set in advance; second determining, for said each data item, whether or not it is necessary to transmit said each data item to the information processing apparatus, based on the priority determined for said each data item; and transmitting a data item to the information processing apparatus among data items generated in the device for a predetermined period of time, the data item being determined by the second (Continued)

determining that it is necessary to transmit the data item to the information processing apparatus.

8 Claims, 11 Drawing Sheets

(56) References Cited

U.S. PATENT DOCUMENTS

2017/0323492 A1    11/2017  Gremmert et al.
2018/0013635 A1*   1/2018   Acharya ............... H04W 4/029
2018/0038709 A1    2/2018   Takahashi

OTHER PUBLICATIONS

Japanese Patent Application No. 2020-551236, Office Action dated Jul. 12, 2022, 5 pages with English Translation.
European Patent Application No. 19871898.3, Official Communication dated Aug. 19, 2022, 7 pages.

* cited by examiner

| DATE AND TIME | VEHICLE ID | ELEMENT ID | Data[0] | Data[1] | Data[2] | Data[3] | Data[4] | ... |

(2)

| DATE AND TIME | VEHICLE ID | ELEMENT ID | Acc_X | Acc_Y | Acc_Z | ... |

FIG.7

| ELEMENT ID | RULE 1 | RULE 2 | · · · |
|---|---|---|---|
| xxx | · · · | · · · | · · · |
| yyy | · · · | · · · | · · · |
| zzz | · · · | · · · | · · · |
| : | : | : | : |

| DATE AND TIME | VEHICLE ID | ELEMENT ID | Data[0] | Data[1] | Data[2] | Data[3] | Data[4] | ... | ANOMALY SCORE | PRIORITY | TRANS-MISSION ORDER ~273 |
|---|---|---|---|---|---|---|---|---|---|---|---|
| 0.57551 | AAAAA | xxx | ... | ... | ... | ... | ... | ... | ... | ... | ... |
| 0.58547 | AAAAA | xxx | ... | ... | ... | ... | ... | ... | ... | ... | ... |
| 0.59597 | AAAAA | xxx | ... | ... | ... | ... | ... | ... | ... | ... | ... |

FIG.9

| DATE AND TIME | VEHICLE ID | ELEMENT ID | Acc_X | Acc_Y | Acc_Z | ... | ANOMALY SCORE | PRIORITY | TRANS-MISSION ORDER |
|---|---|---|---|---|---|---|---|---|---|
| 0.57551 | AAAAA | yyy | ... | ... | ... | ... | ... | ... | ... |
| 0.58547 | AAAAA | yyy | ... | ... | ... | ... | ... | ... | ... |
| 0.59597 | AAAAA | yyy | ... | ... | ... | ... | ... | ... | ... |

274

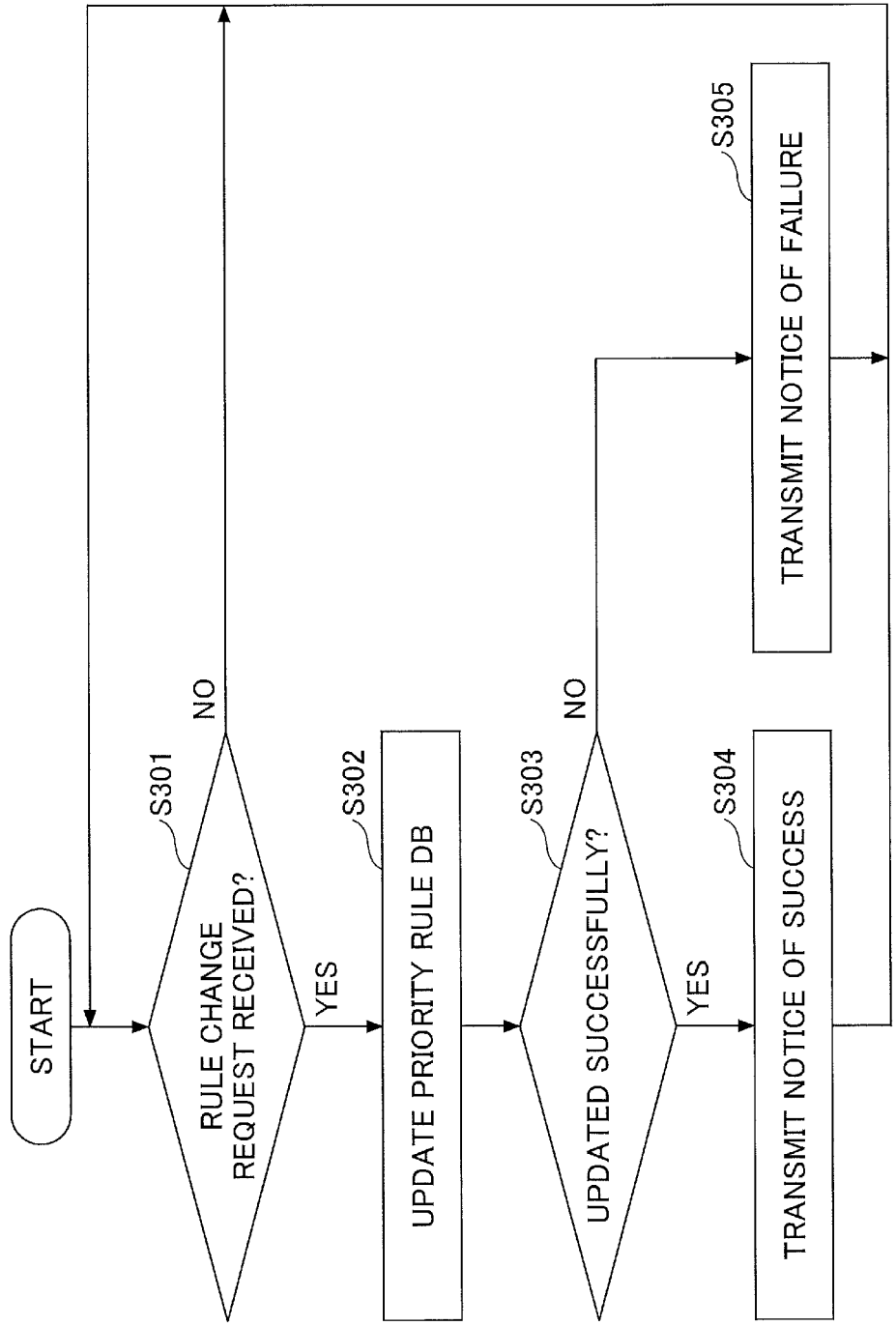

PRIORITIZING DATA USING RULES FOR TRANSMISSION OVER NETWORK

CROSS-REFERENCE TO RELATED APPLICATIONS

This application is a U.S. 371 Application of International Patent Application No. PCT/JP2019/040113, filed on 10 Oct. 2019, which application claims priority to and the benefit of JP Application No. 2018-192414, filed on 11 Oct. 2018, the disclosures of which are hereby incorporated herein by reference in their entireties.

TECHNICAL FIELD

The present invention relates to equipment (a device), a data transmission method, and a program.

BACKGROUND ART

For connected cars (vehicles connected to external networks), which are expected to become popular in the future, improvements in the convenience are expected such that ECUs (Electronic Control Units) can be updated wirelessly, which has been conventionally done by bringing the units to a dealer.

Meanwhile, concerns have been pointed out for vehicles and their control devices connected to an external network; that is, the connected cars would become targets of cyber-attacks from malicious attackers as in the case of conventional IT devices. Research has been reported that it is possible to illegally falsify an ECU actually installed in a vehicle by accessing it from an external network to hijack the control of the vehicle.

Although various measures that can be taken in advance against such threats have been studied, there are no countermeasures that completely prevent the risk of cyber-attacks. Therefore, in case of a cyber-attack, it is necessary to consider effective countermeasures that can be taken afterward. Considering an attack of hijacking the control of a vehicle by falsifying an ECU, in order to take measures in the vehicle, there has been a method of continuously monitoring communication generated in the in-vehicle network to detect anomalies. However, in general, it is often the case that the computational resources for in-vehicle devices are not ample, and it is often the case that anomaly detection methods posing high computational loads are not applicable.

Therefore, nowadays, instead of taking measures only in a vehicle, investigation of techniques in which both the cloud and the vehicle are used for dealing with cyber-attacks by server-client interoperation is in progress so that processing that poses a high computational load is executed on the cloud, and processing that poses a low computational load and a low latency is executed on the in-vehicle device (e.g., Non-Patent Document 1).

RELATED ART DOCUMENTS

Non-Patent Documents

[Non-Patent Document 1] "Development of Automotive Intrusion Detection and Protection Systems against cyber-attack" [online], Internet<URL:https://news.panasonic.com/jp/press/data/2017/10/jn171010-2/jn171010-2.html>

SUMMARY OF INVENTION

Problem to be Solved by the Invention

However, as more in-vehicle devices have become electronically controlled, it is expected that the amount of log information such as communications and states generated in a vehicle and the amount of information on various sensors will increase. From the viewpoint of the storage and communication cost, it is difficult to hold all of these data items in the in-vehicle devices or to upload such data items to a server. Meanwhile, considering the likelihood of cyber-attacks on connected cars as described above, appropriate data items need to be uploaded to a server to detect an attack. In other words, it is necessary to upload anomalies that can be detected by using ample computational resources, and various types of normal data items to update detectors for detecting such anomalies.

Note that the problems as described above are not limited to vehicles; these can be considered as common problems to be solved for various devices connected to networks.

The present invention has been made in view of the above points, and has an object to reduce the communication load due to data generated in a device.

Means for Solving the Problem

Thereupon, in order to solve the problems described above, a device includes a first determination unit configured to determine, for each data item generated in a device, a priority upon transmitting said each data item to an information processing apparatus, based on one or more rules set in advance; a second determination unit configured to determine, for said each data item, whether or not it is necessary to transmit said each data item to the information processing apparatus, based on the priority determined for said each data item; and a transmission unit configured to transmit a data item to the information processing apparatus among data items generated in the device for a predetermined period of time, the data item being determined by the second determination unit that it is necessary to transmit the data item to the information processing apparatus.

Advantage of the Invention

The communication load due to data generated in a device can be reduced.

BRIEF DESCRIPTION OF DRAWINGS

FIG. 6 is a diagram illustrating an example of a configuration of a log;

FIG. 7 is a diagram illustrating an example of a configuration of a priority rule DB 271;

FIG. 8 is a diagram illustrating an example of a configuration of a control log DB 273;

FIG. 9 is a diagram illustrating an example of a configuration of a sensor log DB 274;

FIG. 11 is a flow chart illustrating an example of processing steps of changing a priority rule in response to a request from the monitoring server 10.

EMBODIMENTS OF THE INVENTION

Figure 1:
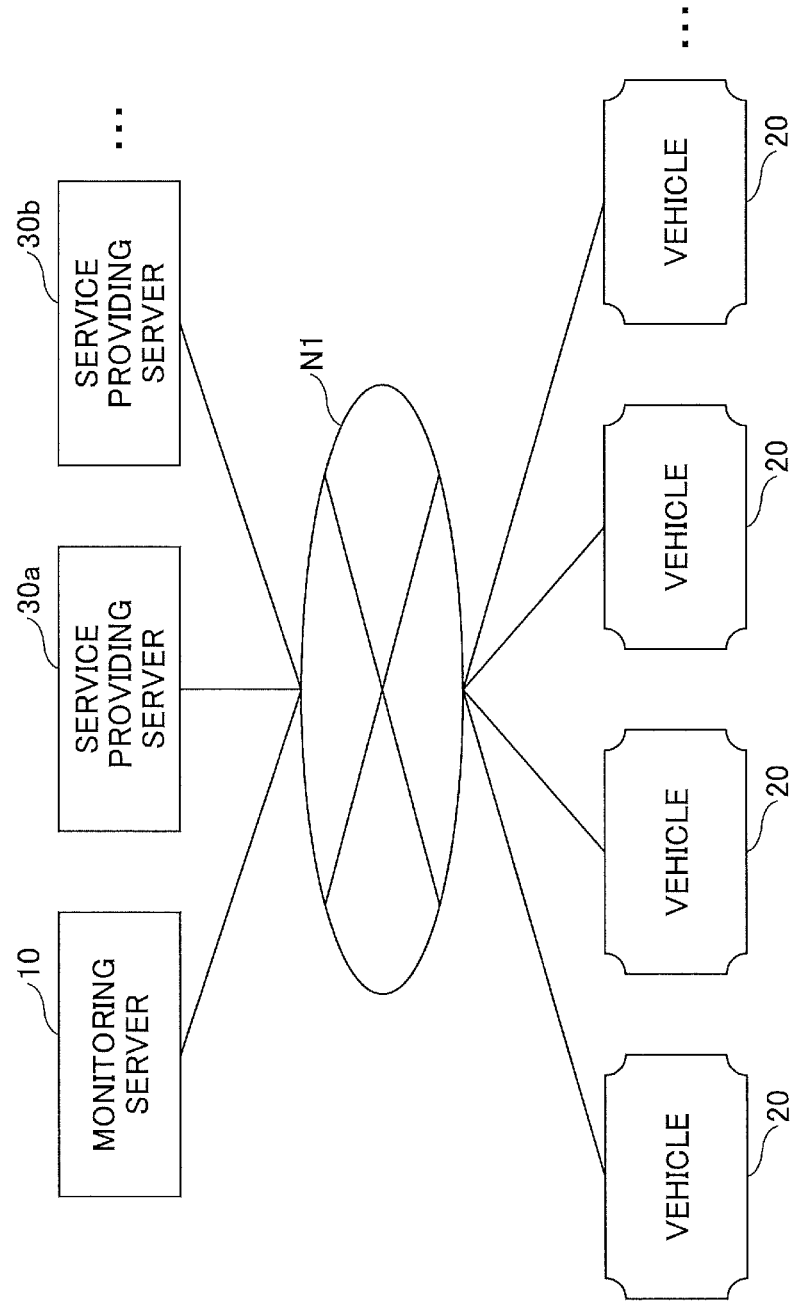
FIG. 1 is a diagram illustrating an example of a system configuration in an embodiment according to the present invention.

In the following, embodiments according to the present invention will be described based on the drawings. FIG. 1 is a diagram illustrating an example of a system configuration in an embodiment according to the present invention. In FIG. 1, multiple vehicles 20 are automobiles (connected cars) connected to various types of servers (e.g., a monitoring server 10, a service providing server 30a, and a service providing server 30b) via a network N1 such as the Internet. For example, each vehicle 20 is connected to the network N1 via a wireless network such as a mobile communication network, to communicate with the various servers.

The service providing server 30a, the service providing server 30b, and the like (hereafter, referred to as the "service providing server(s) 30" if these are not distinguished) are one or more computers that provide predetermined services to the vehicles 20 or services based on information collected from the vehicles 20. For example, the service providing server 30a may provide telematics services. Also, the service providing server 30b may provide services based on data collected from the vehicles 20.

The monitoring server 10 is one or more computers to detect an occurrence of an anomaly in the vehicle 20, and to analyze the contents of the anomaly based on data transmitted (uploaded) from the vehicle 20. An example of an anomaly is a cyber-attack or the like to the vehicle 20 via a network.

Figure 2:
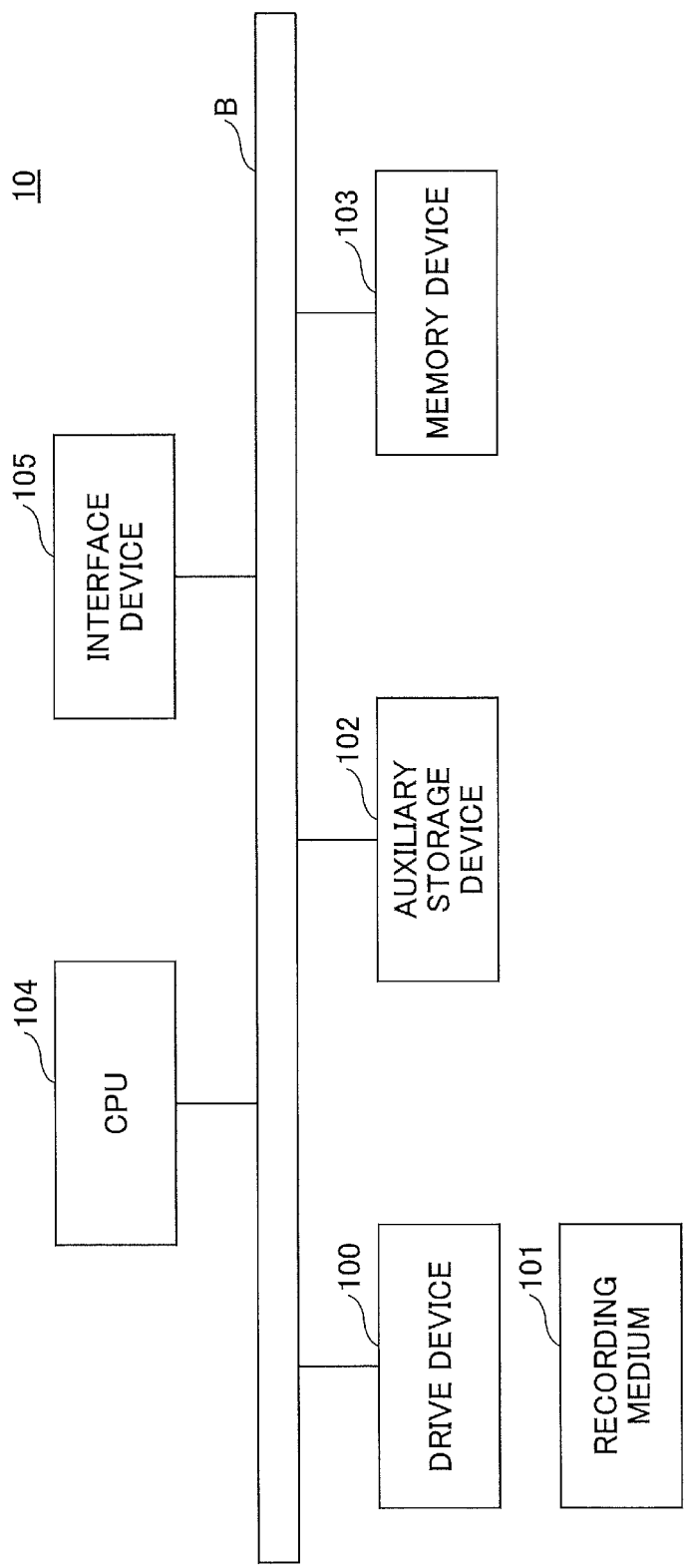
FIG. 2 is a diagram illustrating an example of a hardware configuration of a monitoring server in an embodiment according to the present invention.

FIG. 2 is a diagram illustrating an example of a hardware configuration of the monitoring server in an embodiment according to the present invention. In FIG. 2, the monitoring server 10 includes a drive device 100, an auxiliary storage device 102, a memory device 103, a CPU 104, an interface device 105, and the like, all of which are connected with one another via a bus B.

A program that implements processing on the monitoring server 10 is provided with a recording medium 101 such as a CD-ROM. Once the recording medium 101 on which the program is stored is set in the drive device 100, the program is installed in the auxiliary storage device 102 from the recording medium 101 via the drive device 100. However, installation of the program does not need to be executed from the recording medium 101, and may be downloaded from another computer via the network. The auxiliary storage device 102 stores the installed programs, and stores necessary files, data, and the like.

The memory device 103 reads and stores the program from the auxiliary storage device 102 when receiving a start command of the program. The CPU 104 executes functions related to the monitoring server 10 according to the program stored in the memory device 103. The interface device 105 is used as an interface for connecting to the network.

Figure 3:
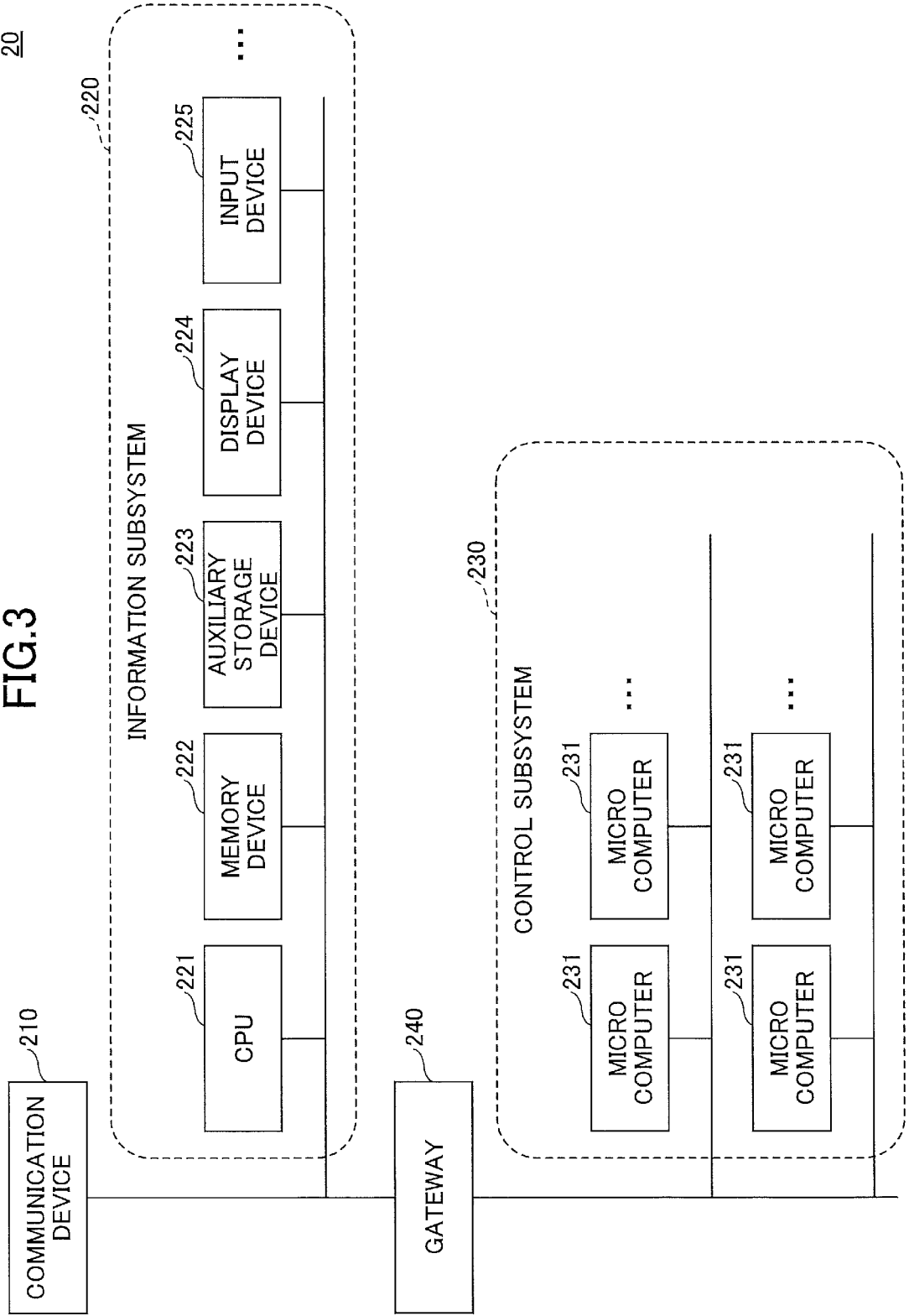
FIG. 3 is a diagram illustrating an example of a hardware configuration of a vehicle 20 in an embodiment according to the present invention.

FIG. 3 is a diagram illustrating an example of a hardware configuration of the vehicle 20 in an embodiment according to the present invention. In FIG. 3, the vehicle 20 includes a communication device 210, an information subsystem 220, a control subsystem 230, a gateway 240, and the like.

The communication device 210 includes a communication module for connecting to the network N1, a communication module for communicating with the other vehicles 20 or devices on roads, a communication module for connecting to smartphones and the like via a wireless LAN or short-distance wireless communication, and the like.

The information subsystem 220 is a part to execute information processing according to the installed programs, and includes a CPU 221, a memory device 222, an auxiliary storage device 223, a display device 224, an input device 225, and the like. The auxiliary storage device 223 stores the installed programs and various items of data used by the programs. The memory device 222 reads and stores a program to be activated from the auxiliary storage device 223. The CPU 221 executes functions related to the information subsystem 220 according to the program stored in the memory device 222. The display device 224 displays a GUI (Graphical User Interface) or the like according to the program. The input device 225 is constituted with operational parts such as buttons and a touch panel to be used for inputting various operation commands. Note that, for example, in-vehicle devices such as a car navigation system and a head unit of a car audio system are examples of the information subsystem 220.

The control subsystem 230 is a part to control the behavior of the vehicle 20, and includes multiple microcomputers 231 and the like for various types of control. For example, an ECU (Electronic Control Unit) is an example of the microcomputer 231.

The gateway 240 is a gateway (e.g., CGW (Central Gateway)) for connecting the information subsystem 220 with the control subsystem 230. In other words, the communication protocol handled in the information subsystem 220 is, for example, an IP protocol; and a communication protocol used for communication between the microcomputers 231 in the control subsystem 230 is a non-IP protocol specialized for control (e.g., CAN (Controller Area Network)). Therefore, the gateway 240 is provided to absorb differences between these communication protocols.

Figure 4:
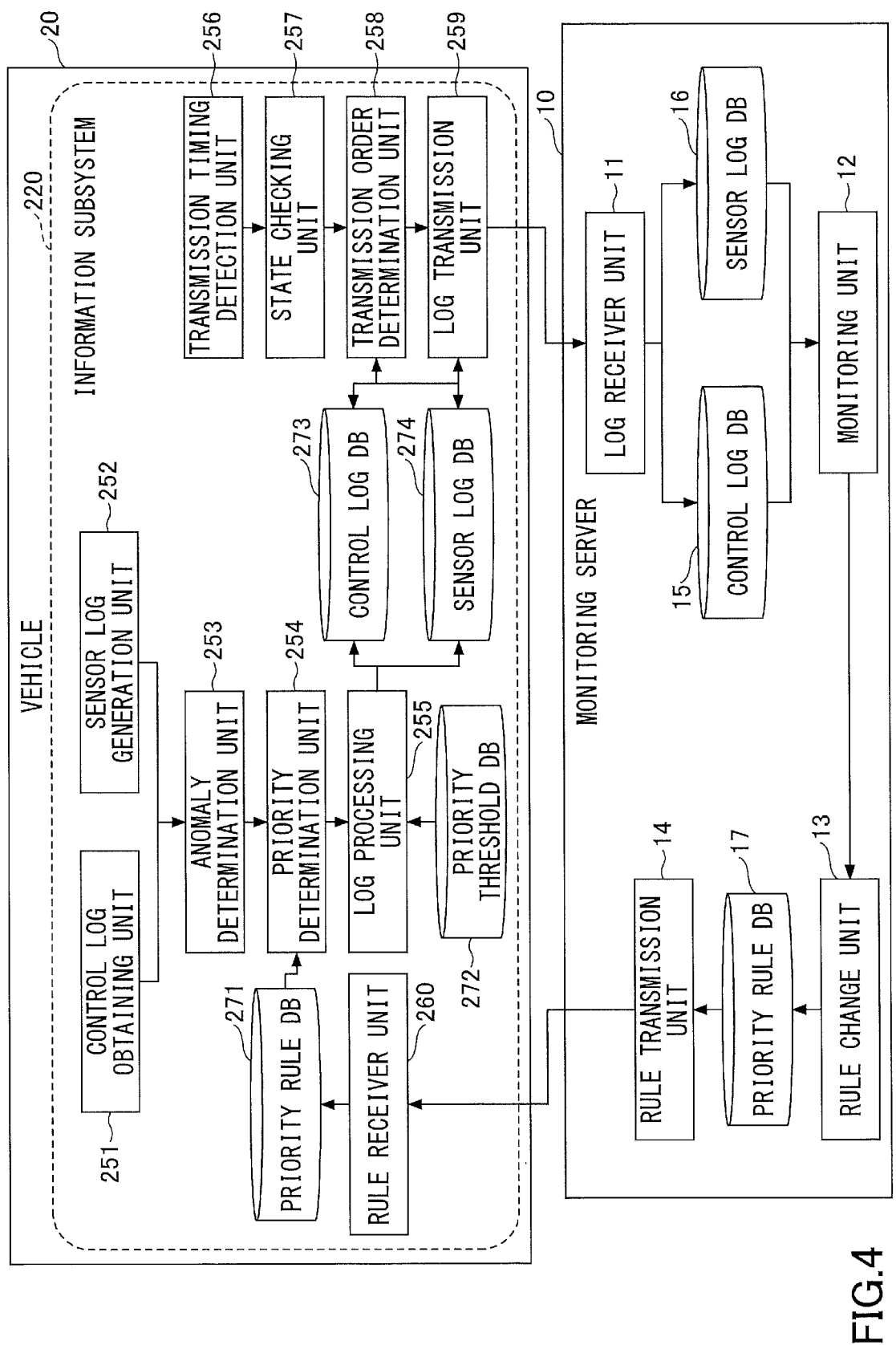
FIG. 4 is a diagram illustrating an example of a functional configuration of the vehicle 20 and the monitoring server 10 in an embodiment according to the present invention.

Note that the hardware configuration illustrated in FIG. 4 is merely an example. The hardware configuration of the vehicle 20 is not limited to any particular one, as long as the functions described later can be implemented.

FIG. 4 is a diagram illustrating an example of a functional configuration of the vehicle 20 and the monitoring server 10 in an embodiment according to the present invention. In FIG. 4, the information subsystem 220 of the vehicle 20 includes a control log obtaining unit 251, a sensor log generation unit 252, an anomaly determination unit 253, a priority determination unit 254, a log processing unit 255, a transmission timing detection unit 256, a state checking unit 257, a transmission order determination unit 258, a log transmission unit 259, a rule receiver unit 260, and the like. These units are implemented by one or more programs installed in the information subsystem 220 that cause the CPU 221 to execute processing. The information subsystem 220 also includes databases (storage unit) such as a priority rule DB 271, a priority threshold DB 272, a control log DB 273, a sensor log DB 274, and the like. These databases (storage unit) can be implemented by using, for example, the memory device 222 or the auxiliary storage device 223.

The control log obtaining unit 251 obtains a control log. The control log corresponds to log data related to communication executed by the microcomputers 231 in the control subsystem 230. The data of communication contents by itself may be used as the control log. Therefore, the control log is generated every time communication is executed by one of the microcomputers 231. Note that the contents of communication includes, for example, contents of control of the vehicle 20; information related to infotainment such as audio, car navigation, and the like; and communication related to displaying of indicators in the vehicle 20.

The sensor log generation unit 252 generates a sensor log. The sensor log corresponds to log data that includes data (e.g., values measured by sensors) obtained from sensors arranged at various locations in the vehicle 20 (e.g., an accelerometer, a GPS (Global Positioning System) receiver, etc.). Obtainment of data from the sensors and generation of a sensor log based on the data are executed at timings such as at regular intervals or upon occurrences of particular events. The generation interval of the sensor log may be different for each sensor. Also, sensors from which sensor logs are generated may be part or all of the sensors installed in the vehicle 20.

The anomaly determination unit 253 determines the degree (level) of anomalousness of the vehicle 20, based on a control log and a sensor log. Specifically, the anomaly determination unit 253 calculates an index value representing the degree of anomalousness (hereafter, referred to as "anomaly score"). However, only the control log may be used for calculating the anomaly score.

The priority determination unit 254 determines the priorities for the control log and the sensor log (hereafter, simply referred to as the "log(s)" if not distinguished from each other) upon transmission to the monitoring server 10. The priority is determined by applying (fitting) the contents of the log and the anomaly score calculated for the log to rules for determining the priority (hereafter, referred to as the "priority rules") stored in the priority rule DB 271. Note that in the present embodiment, the priority is expressed as a numerical value, and a greater value indicates a higher need for transmission to the monitoring server 10.

For each log, the log processing unit 255 compares the priority determined for the log against a threshold value stored in the priority threshold DB 272, to determine whether or not it is necessary to save (and transmit to the monitoring server 10) the log. Once having determined that it is necessary to save the log, the log processing unit 255 saves (stores) the log in the control log DB 273 or the sensor log DB 274.

The transmission timing detection unit 256 detects an arrival of a timing to transmit (upload) logs (hereafter, referred to as the "transmission timing") stored in the control log DB 273 or the sensor log DB 274 to the monitoring server 10.

In response to an arrival of a transmission timing, the state checking unit 257 confirms (checks) the state of the vehicle 20 at that time. For example, whether or not the vehicle 20 is in a traveling state (or in a stop state), the communication state of the communication device 210, and the like are confirmed.

The transmission order determination unit 258 determines the transmission order of logs stored in the control log DB 273 or the sensor log DB 274 between the previous transmission timing and the current transmission timing (hereafter, referred to as "transmission candidate logs") based on the respective priorities and the like of the logs. Here, logs may be transmitted without passing through the control log DB 273 and the sensor log DB 274. In other words, a form in which the control log DB 273 and the sensor log DB 274 are not used may be adopted.

The log transmission unit 259 transmits the transmission candidate logs to the monitoring server in order according to the transmission order.

The rule receiver unit 260 receives a request for changing a priority rule delivered from the monitoring server 10, to change (update) the priority rule DB 271 with respect to the priority rule included in the change request.

Meanwhile, the monitoring server 10 includes a log receiver unit 11, a monitoring unit 12, a rule change unit 13, a rule transmission unit 14, and the like. These units are implemented by one or more programs installed in the monitoring server 10 causing the CPU 104 to execute processing. The monitoring server 10 also uses databases (storage unit) such as a control log DB 15, a sensor log DB 16, and a priority rule DB 17. These databases (storage unit) can be implemented by using, for example, the auxiliary storage device 102 or a storage device that can be connected to the monitoring server 10 via a network.

The log receiver unit 11 receives a log transmitted (uploaded) from the vehicle 20, and stores the log in the control log DB 15 or the sensor log DB 16.

The monitoring unit 12 detects an occurrence or a likelihood of an occurrence of a cyber-attack on the vehicle 20, based on the logs and the like stored in the control log DB 15 or the sensor log DB 16. Once having detected an occurrence or a likelihood of an occurrence of a cyber-attack, the monitoring unit 12 requests the rule change unit 13 to change the priority rules.

In response to the request from the monitoring unit 12, the rule change unit 13 changes part or all of the priority rules stored in the priority rule DB 17. Note that the priority rule DB 17 stores all the priority rules distributed to the vehicles 20.

The rule transmission unit 14 distributes a change request that includes priority rules changed by the rule change unit 13 to the vehicles 20.

Figure 5:
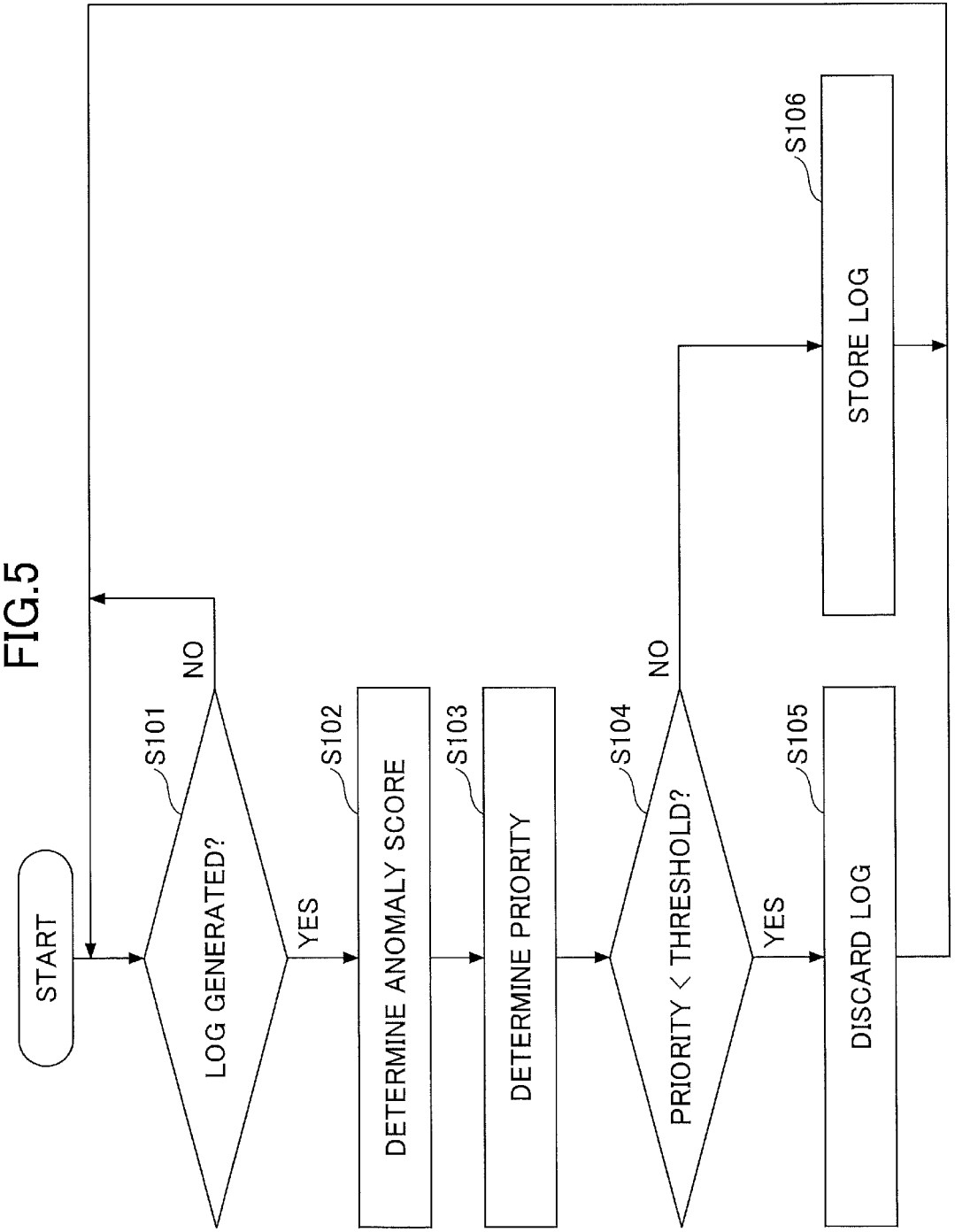
FIG. 5 is a flow chart illustrating an example of processing steps when a log is generated.

In the following, processing steps executed by the information subsystem 220 of the vehicle 20 will be described. FIG. 5 is a flow chart illustrating an example of processing steps when a log is generated.

When a log (hereafter, referred to as a "target log") is generated upon one of events among obtainment of a control log by the control log obtaining unit 251; generation of a sensor log by the sensor log generation unit 252; and the like (YES at Step S101), the anomaly determination unit 253 determines (calculates) the anomaly score for the target log at Step S102.

FIG. 6 is a diagram illustrating an example of a configuration of a log. In FIG. 6, (1) illustrates an example of the control log. The control log includes date and time, a vehicle ID, an element ID, Data[0], Data[1], Data[2], Data[3], Data[4], . . . , and so on (hereafter, referred to as "Data[ ]"). The date and time represent date and time when the control log was obtained (the date and time when a communication related to the control log was executed). The vehicle ID is identification information on a vehicle 20. The element ID is identification information on a component of the vehicle 20. The element ID in the control log is identification information on a microcomputer 231 that executed the communication related to the control log. Data[ ] represents data included in the communication. For example, if the communication is related to control of the engine, values of respective parameters related to the control of the engine are the values of the respective elements of Data[ ]. Here, Data [ ] may include not only the values of the respective parameters related to the control of the engine, but also data such as the checksum and counter.

Meanwhile, (2) illustrates an example of the sensor log. The sensor log includes date and time, a vehicle ID, an element ID, and data specific to a sensor related to the sensor log. The date and time are date and time when the sensor log was generated. The vehicle ID is identification information on a vehicle 20. The element ID is identification information on a sensor as the output source of the data related to the sensor log. Also, the sensor log in FIG. 6 is a sensor log based on data obtained from an acceleration sensor, and hence, includes Acc_X, Acc_Y, and Acc_Z as data specific to the acceleration sensor. Acc_X, Acc_Y, and Acc_Z are acceleration in the X-axis direction, acceleration in the Y-axis direction, and acceleration in the Z-axis direction, respectively.

Note that the anomaly score with respect to a target log can be determined (calculated) by using publicly-known techniques. For example, the anomaly score may be determined by inputting the target log into a trained model (e.g., a neural network) that receives a log as input, and outputs an anomaly score. The anomaly score may be 0 or 1 indicating the presence or absence of an anomaly, or may be a value indicating the degree of anomalousness within a range from a minimum value (e.g., "0") to a maximum value (e.g., "1"). Also, the anomaly score does not need to be determined using both the control log and the sensor log. For example, just one of the control log and the sensor log may be used for determining the anomaly score.

Next, at Step S103, the priority determination unit 254 refers to the priority rule DB 271, to determine the priority of the target log.

Figure 7:
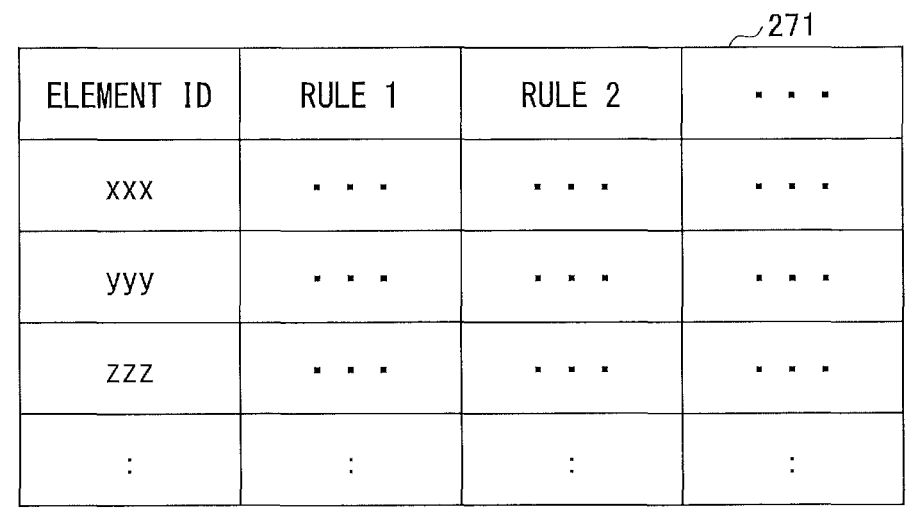

FIG. 7 is a diagram illustrating an example of a configuration of the priority rule DB 271. In FIG. 7, the priority rule DB 271 stores one or more priority rules for each element ID (i.e., for each of the microcomputers 231 and for each of the sensors). In other words, the characteristics of logs are different depending on the respective microcomputers 231 and the respective sensors; therefore, priority rules can be set according to the respective characteristics. One priority rule may be defined to output one numeric value indicating a priority. In this case, there may be a certain priority rule that discretely determines a priority by comparing the value of one of the items of the log against one or more threshold values. Also, there may be another priority rule that calculates a priority by substituting the value of one of the items of the log in a predetermined function. Also, a priority rule may also be defined that sets a priority to be greater than or equal to the threshold value at Step S104 only in the case where the vehicle ID is a specific value, or otherwise, sets the priority to be less than the threshold value at Step S104. In this way, the upload sources of logs can be limited to part of the vehicles 20.

For example, for a microcomputer 231 having a periodicity in the timing of communication, if the variance of the interval in terms of date and time with respect to logs (control logs) for the microcomputer 231 is greater than or equal to a threshold value, a priority rule of increasing the priority may be set. Also, if the interval is less than the threshold value, a priority rule of not increasing the priority or decreasing the priority may be set. Here, "increasing the priority" may be implemented by outputting a positive-valued priority, and "decreasing the priority" may be implemented by outputting a negative-valued priority.

Also, for each microcomputer 231 or each sensor, a priority rule of increasing the priority may be set if the value of one of the items of a log related to the microcomputer 231 or the sensor is out of the range of possible values in a normal state or if the outlierness from the range (the difference from the range) is greater than or equal to the threshold value.

Also, for each microcomputer 231 or each sensor, a priority rule of increasing the priority may be set in the case where the anomaly score is greater than or equal to a threshold value.

Note that each of the threshold values described above may be different for each microcomputer 231 and for each sensor. Also, the priority determination unit 254 may dynamically change the criteria for the priority (e.g., the threshold values described above, etc.) based on the priority rules depending on the state and the like of the vehicle 20.

For example, in a high-speed traveling state, a threshold value related to a priority rule of a log of a microcomputer 231 related to functions of safety, such as the acceleration, the angle of the steering, the tension of the seat belt, and the like of the vehicle 20 may be changed so as to make the priority more likely to be increased than in a low-speed traveling state. Specifically, a first threshold value in a high-speed traveling state (a state of the speed being greater than or equal to a certain value) and a second threshold value in a low-speed traveling state (a state of the speed being less than the certain value) may be set in advance, so as to select the threshold value to be applied to the priority rule depending on the traveling state. Alternatively, a function may be defined that receives the speed as input, and outputs a threshold value.

Also, after an update of the software of a microcomputer 231, there is a likelihood of unauthorized falsification by an attacker. Thereupon, for each microcomputer 231, a priority rule of increasing the priority of a log for the microcomputer 231 may be set for a certain period of time after an occurrence of update processing of the software. Alternatively, for the certain period of time, a threshold of a priority rule set with respect to the microcomputer 231 may be dynamically changed so as to increase the priority.

In any case, the priority rule may be set to increase the priority of a log from which a value diverged or deviated from a value obtained in a log obtained under a normal condition, or a high anomaly score is obtained.

Also, in FIG. 7, multiple priority rules can be set for each microcomputer 231 and each sensor, a priority rule of defining a method of combining multiple priority rules may be set for each microcomputer 231 and for each sensor. In this case, the priority rule may be, for example, a rule of selecting a maximum value of the priority output by the multiple priority rules, or a rule of determining the priority by the total value, weighted average, or sum of products. Alternatively, the priority rule may be a rule of calculating a final priority by a function that takes the priority rules as the arguments.

Next, at Step S104, the log processing unit 255 compares the priority determined at Step S103 against a threshold stored in association with an element ID of the target log in the priority threshold DB 272. If the priority is less than the threshold value (YES at Step S104), at Step S106, the log processing unit 255 discards the target log. In other words, in this case, the target log is not saved in the control log DB 273 or the sensor log DB 274. This also means that the target log is not to be transmitted to the monitoring server 10. Note that as described above, the logs may be transmitted without passing through the control log DB 273 and the sensor log DB 274.

Conversely, if the priority is greater than or equal to the threshold value (NO at Step S104), at Step S105, the log processing unit 255 saves the target log in the control log DB 273 or the sensor log DB 274. In other words, if the target log is a control log, the target log is saved in the control log DB 273. If the target log is a sensor log, the target log is saved in the sensor log DB 274. At this time, the anomaly score determined at Step S102 and the priority determined at Step S103 are assigned to the target log.

FIG. 8 is a diagram illustrating an example of a configuration of the control log DB 273. As illustrated in FIG. 8, each record of the control log DB 273 includes the items of (1) in FIG. 6, an anomaly score, a priority, and a turn in a transmission order. Among these, at the timing of executing Step S105, the value of a turn in a transmission order of a log stored in the control log DB 273 after the last transmission timing is empty. The transmission order is determined when logs are to be transmitted.

FIG. 9 is a diagram illustrating an example of a configuration of the sensor log DB 274. As illustrated in FIG. 9, each record of the sensor log DB 274 includes the items of (2) in FIG. 6, an anomaly score, a priority, and a turn in a transmission order. Among these, at the timing of executing Step S105, the value of a turn in a transmission order of a log stored in the control log DB 273 after the last transmission timing is empty, for the same reason as in the control log DB 273. Note that the format of a sensor log varies from sensor to sensor. For example, in the case of a sensor log of a GPS receiver, latitude, longitude, and the like are included. Therefore, the sensor log DB 274 may store sensor logs in different tables that are separated for the respective sensors (per element ID).

Note that in the following, a log means data added with items of an anomaly score, a priority, and a turn in a transmission order. However, in the case where the vehicle 20 does not include the anomaly determination unit 253, the value of the anomaly score may be zero, or the item of the anomaly score may be set blank.

Figure 10:
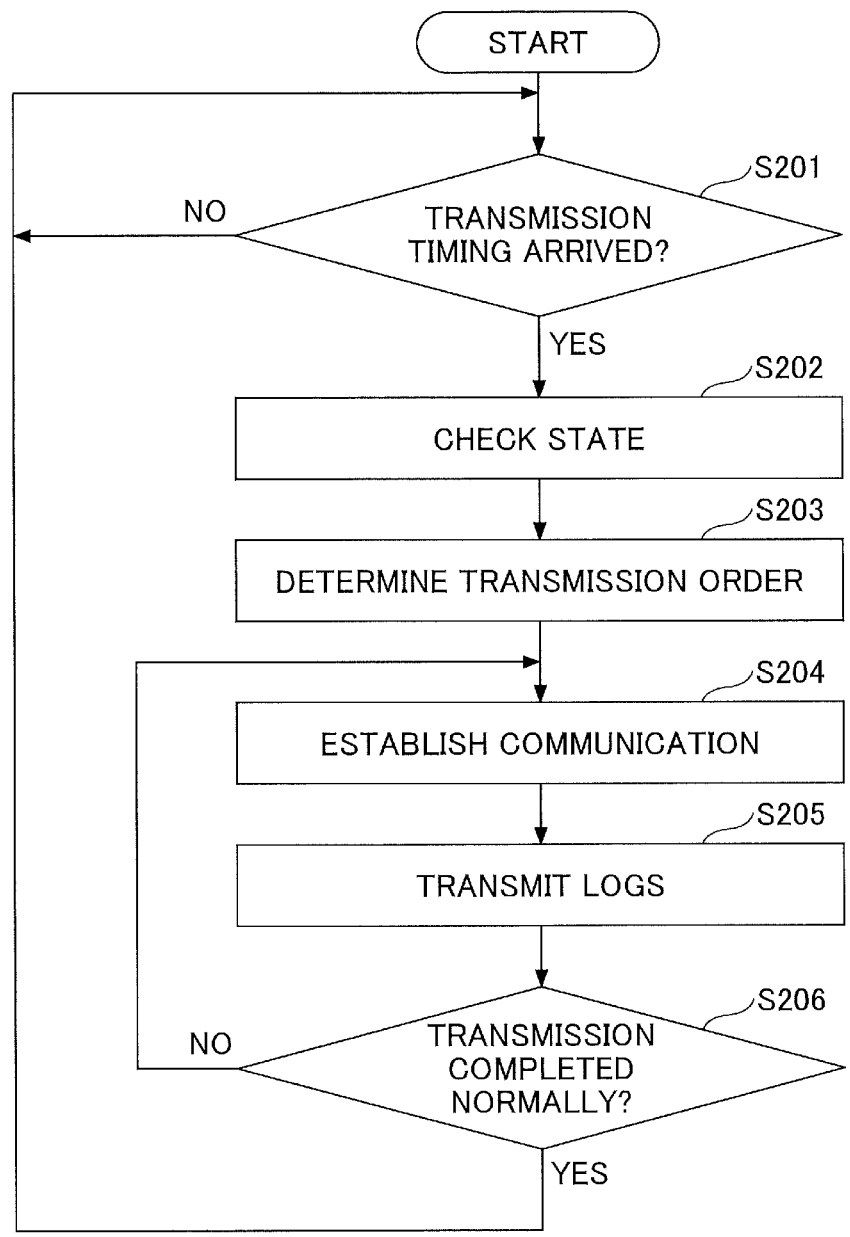
FIG. 10 is a flow chart illustrating an example of processing steps when transmitting logs to a monitoring server 10.

FIG. 10 is a flow chart illustrating an example of processing steps when transmitting logs to a monitoring server 10.

If the transmission timing detection unit 256 detects an arrival of a transmission timing of logs (YES at Step S201), Step S202 and subsequent steps are executed. For example, the transmission of logs may be executed at regular intervals. In this case, the transmission timing detection unit 256 detects an arrival of a transmission timing after a certain period of time has elapsed since the previous transmission of logs. Alternatively, the transmission of a log may be executed in response to an occurrence of a specific log. In this case, the transmission timing detection unit 256 detects an arrival of a transmission timing if the target log corresponds to a specific log. As an example of the specific log, a log having a very high anomaly score may be considered. Alternatively, the transmission of logs may be executed every time a certain number of logs are saved. In this case, the transmission timing detection unit 256 detects an arrival of a transmission timing when the total number of logs saved in the control log DB 273 or the sensor log DB 274 reaches a certain number after the previous transmission of logs. Alternatively, the transmission of logs may be executed in response to an occurrence of a certain event (e.g., change in the communication scheme between the vehicle 20 and the monitoring server 10, etc.). In this case, the transmission timing detection unit 256 detects an arrival of a transmission timing in response to an occurrence of a specific event. Alternatively, the transmission of logs may be executed at two or more timings as described above, or the transmission of logs may be executed in response to a request for transmission from the monitoring server 10.

At Step S202, the state checking unit 257 checks the state of the vehicle 20 and the state of communication between the vehicle 20 (the communication device 210) and the monitoring server 10. The state of the vehicle 20 includes, for example, a traveling state (e.g., traveling speed) of the vehicle 20 and the like. The state of communication between the vehicle 20 and the monitoring server 10 includes, for example, the communication scheme, stability, throughput, and the like. The stability may be evaluated in terms of, for example, variation of the throughput, loss rate of packets, and the like.

The communication scheme means a route on the network to be used for communication and a method of communication in the network. For example, the communication device 210 may have redundancy with respect to the communication scheme with the monitoring server 10. Specifically, in the case where it is difficult to establish a connection with a normal communication scheme (e.g., a communication scheme using a mobile communication network), the communication device 210 may be capable of maintaining the communication with the monitoring server 10 using another communication scheme. For example, if it is possible to connect to a mobile communication network via a smart terminal or the like of one of the occupants of the vehicle 20, the communication device 210 may establish a connection with the monitoring server 10 via the smart terminal. Alternatively, the communication device 210 may be capable of communicating with a roadside unit, an ITS infrastructure, or the other vehicles 20. In this case, the communication device 210 may establish a connection with the monitoring server 10 by using road-to-vehicle communication or inter-vehicle communication.

In this way, in the case where the communication device 210 has redundancy in the communication scheme with the monitoring server 10, when confirming the communication scheme, alternatives of the communication scheme that can be adopted between the communication device 210 and the monitoring server 10 are confirmed.

Next, at Step S203, the transmission order determination unit 258 determines the transmission order of logs (transmission candidate logs) stored in the control log DB 273 or the sensor log DB 274 between the previous transmission timing and the current transmission timing. The transmission order may be determined, for example, in descending order of the priority. In this case, a transmission candidate log having a higher priority has a prior turn in the transmission order. Alternatively, the transmission order may be adjusted based on the state of the vehicle 20, such as the traveling state confirmed at Step S202. For example, if the vehicle speed is greater than or equal to a threshold value, a transmission candidate log of a microcomputer 231 related to the behavior of the vehicle 20 may be given a prior turn in the transmission order. On the other hand, if the vehicle speed is less than the threshold value (e.g., while the vehicle stops), a transmission candidate log of the microcomputer 231 related to the telemetry may be given a prior turn in the transmission order. In this way, depending on the state of the vehicle 20, the transmission order of logs related to a particular microcomputer 231 or sensor may be changed.

Such an adjustment (change in the transmission order) may be executed among a group of transmission candidate logs having the same priority, or may be executed beyond the range of a group of transmission candidate logs having the same priority. The adjustment among a group of transmission candidate logs having the same priority means that among the group of transmission candidate logs having the same priority, a transmission candidate log of a microcomputer 231 related to the behavior the vehicle 20 is given a prior turn in the transmission order, or a microcomputer 231 related to the telemetry is given a prior turn in the transmission order. The adjustment beyond the range of a group of transmission candidate logs having the same priority means, for example, to determine the transmission order in descending order of the priority after adding a predetermined value to the priority of a transmission candidate log of a microcomputer 231 related to the behavior of the vehicle 20 or a transmission candidate log of a microcomputer 231 related to the telemetry. At this time, the predetermined value may be a value greater than or equal to the highest priority among the transmission candidate logs. In other words, a transmission candidate log of a microcomputer 231 related to the behavior of the vehicle 20 or a transmission candidate log of a microcomputer 231 related to the telemetry may be given a relatively prioritized turn in the transmission order compared against the other logs. Note that whether or not each transmission candidate log is a transmission candidate log of a microcomputer 231 related to the behavior of the vehicle 20 or a transmission candidate log of a microcomputer 231 related to the telemetry can be determined based on the element ID of the transmission candidate log. For example, information representing the type of function of a microcomputer 231 or a sensor corresponding to the element ID may be stored in advance in the auxiliary storage device 223 or the like.

Next, at Step S204, the log transmission unit 259 establishes communication between the communication device 210 and the monitoring server 10, by using one of the alternatives of the communication scheme confirmed at Step S202 (e.g., an alternative of the highest communication speed).

Next, at Step S205, the log transmission unit 259 transmits each transmission candidate log to the monitoring server 10 in the order according to the transmission order determined at Step S203. At this time, transmission candidate logs actually transmitted may be limited up to the M-th turn (where M<the number of transmission candidate logs) in the transmission order. In other words, the logs to be transmitted may be limited to part of the transmission candidate logs. In particular, in the communication state with the monitoring server 10, in the case where the throughput is low or in the case where the stability is low, the logs to be transmitted may be narrowed down. Also, the value of M described above may be changed depending on the communication state. In other words, in the case where the communication state is good (e.g., the throughput is greater than or equal to a threshold value), the value of M may be increased, or otherwise, the value of M may be decreased. Note that the value of M may be set to 0. In other words, depending on the communication state, it may be determined that none of the transmission candidate logs is to be transmitted. In this case, the transmission candidate logs at the current transmission timing may be included in transmission candidate logs at the next transmission timing.

Also, the logs to be transmitted may be narrowed down by setting only logs of particular microcomputers 231 or particular sensors as the logs to be transmitted, instead of based on the number of logs to be transmitted. Specifically, at Step S203, in the case where a transmission candidate log of a microcomputer 231 related to the behavior of the vehicle 20 or a transmission candidate log of a microcomputer 231 related to the telemetry is set to have a prior turn in the transmission order, only a transmission candidate log of the microcomputer 231 related to the vehicle 20 or a transmission candidate log of a microcomputer 231 related to the telemetry may be set as the log to be transmitted.

Note that in the case where the communication speed is high and the stability of communication is high, all transmission candidate logs may be set as the logs to be transmitted. However, a transmission candidate log related to a particular microcomputer 231 or a sensor may be transmitted to the monitoring server 10 only in the case of being connected to an authenticated wireless AP or base station (i.e. only in the case where the safety of the communication path is secured). In this way, it may be attempted to reduce the likelihood of leakage of confidential information.

Next, at Step S206, the log transmission unit 259 determines whether or not the transmission of the transmission candidate logs that are logs to be transmitted is completed successfully. For example, as in HTTP (HyperText Transfer Protocol), in the case where the transmission candidate log is transmitted using a communication scheme in which a response from the communication counterpart (the monitoring server 10) is expected, if a normal response from the monitoring server 10 is received, the transmission of the transmission candidate log may be determined to have been successfully completed. On the other hand, as in UDP (User Datagram Protocol), in the case where the transmission candidate log is transmitted using a communication scheme in which a response from the communication counterpart (the monitoring server 10) is not expected, upon completion of the transmission, the transmission of the transmission candidate log may be determined to have been successfully completed.

If the transmission of part or all of the transmission candidate logs to be transmitted fails (NO at Step S206), Step S204 and subsequent steps are repeated. In this case, at Step S204, communication with the monitoring server 10 may be established with a communication scheme different from the previous scheme.

Note that the logs transmitted by the log transmission unit 259 are received by the log receiver unit 11 of the monitoring server 10. The log receiver unit 11 saves a received log in the control log DB 15 if the log is a control log, or saves the log in the sensor log DB 16 if the log is a sensor log. Note that the configuration of the control log DB 15 may be similar to that of the control log DB 273 (FIG. 8). Also, the configuration of the sensor log DB 16 may be similar to that of the sensor log DB 274 (FIG. 9).

FIG. 11 is a flow chart illustrating an example of processing steps when changing a priority rule in response to a request from the monitoring server 10.

At Step S301, the rule receiver unit 260 is waiting for a request for changing a priority rule from the monitoring server 10. If the rule receiver unit 260 receives a request for changing (YES at Step S301), Step S302 and subsequent steps are executed. For example, the monitoring server 10 transmits the request for changing the priority rule to the vehicles 20 at the following timing.

The monitoring unit 12 of the monitoring server 10 refers to a group of logs saved in the control log DB 15 or the sensor log DB 16 periodically, or every time a new log is saved in the control log DB 15 or the sensor log DB 16, to determine whether there is a likelihood of an occurrence of a large-scale anomaly (an anomaly spanning multiple vehicles 20) such as a cyber-attack. The method of determining whether there is a likelihood of an occurrence of such an anomaly is not limited to a predetermined method. For example, it may be executed based on a trained model (such as a neural network), or may be executed by using any other publicly-known techniques. Also, the monitoring unit 12 may detect whether there is a likelihood of an occurrence of an anomaly such as a cyber-attack, based on information sources other than logs. For example, the monitoring unit 12 may detect an occurrence of a cyber-attack or a concern for such an occurrence by using a CERT (Computer Emergency Response Team) of a car company, an SOC (Security Operation Center) operated by another company, information on announcements from security vendors, and the like.

Once having detected that a cyber-attack is occurring on a particular microcomputer 231, for example, the monitoring unit 12 requests the rule change unit 13 to change the priority rule so as to increase the priority of the log related to the microcomputer 231. The rule change unit 13 changes the priority rule related to the microcomputer 231 so as to have a higher priority than set previously. For example, the rule change unit 13 changes the contents of definition for each of the priority rules stored in association with the element ID of the microcomputer 231 in the priority rule DB 17, so as to have a higher priority than set previously output. Specifically, a threshold used in the priority rule may be changed. Alternatively, a priority rule such as adding infinity to the priority may be added to the element ID of the microcomputer 231. In this way, the priority of a control log related to the microcomputer 231 can be set to infinity all the time. The rule transmission unit 14 distributes a change request that includes changed priority rules to the vehicles 20. At this time, a vehicle 20 that has already received a cyber-attack may be excluded from the destinations of distribution of the change request. A vehicle 20 that has already received a cyber-attack can be identified based on the vehicle ID of a log from which the likelihood of the server attack was detected.

Alternatively, once having detected a likelihood of a cyber-attack that is occurring on a particular type of vehicle, the monitoring unit 12 requests the rule change unit 13 to change the priority rule so as to increase the priority of the log of the vehicles 20 corresponding to the type. For example, in the case where the priority rule is defined for each type of vehicle, the rule change unit 13 changes the contents of definition for all or part of the priority rules related to the vehicle type, so as to output a higher priority than in set previously. The rule transmission unit 14 distributes the change request that includes the changed priority rules to the vehicles 20 corresponding to the type. Conversely, in the case where the priority rule is not defined for each type of vehicle, the rule change unit 13 generates copies of all or part of the priority rules, and for the copies, changes the contents of definition so as to output a higher priority than in set previously. The rule transmission unit 14 distributes the change request that includes the copies of the changed priority rules to the vehicles 20 corresponding to the type. Note that at this time, a vehicle 20 that has already received a cyber-attack may be excluded from the destinations of distribution of the change request.

At Step S302, the rule receiver unit 260 updates the priority rule DB 271 with the priority rules included in the received change request. Specifically, among the priority rules stored in priority rule DB 271, a priority rule including the same element ID as in a received priority rule is overwritten by the received priority rule.

If the priority rule DB 271 is successfully updated (YES at Step S303), at Step S304, the rule receiver unit 260 transmits a notice of success to the monitoring server 10. If having failed to update the priority rule DB 271 (NO at Step S303), at Step S305, the rule receiver unit 260 transmits a notice of failure to the monitoring server 10.

In this way, in the present embodiment, the priority rules of each vehicle 20 can be changed based on a reason on the monitoring server 10 side. Therefore, logs stored in each vehicle 20 or logs transmitted from each vehicle 20 can be changed dynamically. As a result, for example, in the case where it is desirable to cause the monitoring unit 12 of the monitoring server 10 to use logs of a particular microcomputer 231 as training data for detecting an anomaly of the microcomputer 231, the likelihood of collecting logs of the microcomputer 231 can be increased.

Note that a request for changing the priority rule from the monitoring server 10 may include a span of logs (periodic span) to which the priority rule after the change is applied. In this case, the span may include periods in the past. In this way, priority rules after the change may be applied to logs that have been logged prior to the change request. For example, the logs to be transmitted may be changed in response to a request for transmission of the logs from the monitoring server 10, by determining afresh the priority of the logs before the change request.

Note that in the present embodiment, although the vehicles 20 have been described as examples of devices, the present embodiment may be applied to any other devices having communication functions. For example, the present embodiment may be applied to devices such as robots in factories; sensors, audio devices, home appliances, communication terminals (smartphones, tablet terminals, etc.) located various places; and devices commonly called as IoT (Internet of Things) devices.

As described above, according to the present embodiment, for each data item (log) generated in the vehicle 20, the priority is determined based on priority rules, and a log (transmission candidate log) that is determined necessary to be transmitted based on the priority is transmitted to the monitoring server 10. Therefore, the amount of logs to be transmitted can be reduced compared to the case of transmitting all logs to the monitoring server 10. As a result, the communication load due to a log (data) generated in the vehicle 20 (a device) can be reduced.

Also, the transmission candidate logs are stored in the database, and the other logs are discarded. Therefore, the consumption of the memory area in the vehicle 20 can be reduced.

Also, for transmission candidate logs, the transmission order is determined based on the priority, and each transmission candidate log is transmitted according to the transmission order. Therefore, a transmission candidate log having a high priority can be prioritized to be transmitted to the monitoring server 10.

Also, a criterion for determining whether or not to transmit a log based on the priority is changed depending on the state of the vehicle 20. Therefore, the priority of each log (i.e., whether or not to save the log in the database) can be changed dynamically depending on the state of the vehicle 20.

Also, for a transmission candidate log, a criterion for determining that the log is to be transmitted is changed depending on the state of the vehicle 20. Therefore, the logs transmitted to the monitoring server 10 may be changed depending on the state of the vehicle 20.

Also, a priority rule can be changed in response to a request from the monitoring server 10. Therefore, the likelihood that a log required by the monitoring server 10 is determined as a log to be transmitted can be increased.

Note that in the present embodiment, the vehicle 20 is an example of a device. The monitoring server 10 is an example of an information processing apparatus. The priority determination unit 254 is an example of a first determination unit. The log processing unit 255 is an example of a second determination unit. The log transmission unit 259 is an example of a transmission unit. The control log DB 273 and the sensor log DB 274 are examples of a storage unit. The transmission order determination unit 258 is an example of a determination unit. The rule receiver unit 260 is an example of a change unit.

As described above, embodiments according to the present invention have been described in detail; note that the present invention is not limited to such specific embodiments, and various modifications and alterations can be made within the scope of the subject matters of the present invention described in the claims. The present application claims priority to Japanese Patent Application No. 2018-192414 filed on Oct. 11, 2018, the entire contents of which are hereby incorporated by reference.

DESCRIPTION OF REFERENCE SYMBOLS 10 monitoring server
11 log receiver unit
12 monitoring unit
13 rule change unit
14 rule transmission unit
15 control log DB
16 sensor log DB
17 priority rule DB
20 vehicle
30a service providing server
30b service providing server
100 drive device
101 recording medium
102 auxiliary storage device
103 memory device
104 CPU
105 interface device
210 communication device
221 CPU
222 memory device
223 auxiliary storage device
224 display device
225 input device
220 information subsystem
230 control subsystem
231 microcomputer
240 gateway
251 control log obtaining unit
252 sensor log generation unit
253 anomaly determination unit
254 priority determination unit
255 log processing unit
256 transmission timing detection unit
257 state checking unit
258 transmission order determination unit
259 log transmission unit
260 rule receiver unit
271 priority rule DB
272 priority threshold DB
273 control log DB
274 sensor log DB
B bus

The invention claimed is:

1. A device comprising:
a memory; and
a processor configured to execute:
first determining, for a data item of a plurality of data items generated in the device, a priority for transmitting the data item of the plurality of data items, based on one or more rules set in advance, wherein at least one rule relates to a sensed state of a vehicle housing the device;
second determining, for the data item of the plurality of data items, whether to transmit the data item, based on the priority determined for the data item of the plurality of data items;
transmitting one or more of the plurality of data items through a network, wherein
the one or more of the plurality of data items is generated in the device during a predetermined period of time,
the transmitting of the one or more of the plurality of data items through the network is according to a transmission order associated with respective data items of the plurality of data items,
the transmission order is based at least on a combination of the priority for transmitting the data item of the plurality of data items and the second determining to transmit the data item of the plurality of the data items, and
the transmission order changes according to the state of the vehicle; and
causing transmission of the one or more of the plurality of data items in a modified sequence according to the changed transmission order.

2. The device as claimed in claim 1, wherein the processor is further configured to execute:
storing in the memory the data item of the plurality of data items determined by the second determining;
storing a transmission order value with the data item stored in the memory,
wherein the transmitting further comprises transmitting the data item stored in the memory.

3. The device as claimed in claim 1, wherein the processor is further configured to execute:
determining the transmission order of the data items based on the priority among the one or more of the plurality of data items generated in the device during the predetermined period of time, the one or more of the plurality of data items being determined by the second determining that it is necessary to transmit the one or more of the plurality of data items to an information processing apparatus, and
wherein the transmitting transmits the data items in order according to the transmission order.

4. The device as claimed in claim 1, wherein the second determining further comprises changing a criterion for determining whether or not it is necessary to transmit each data item based on the priority, depending on a state of the device.

5. The device as claimed in claim 1, wherein a number of data items for transmission according to the transmission order changes in the device depending on a communication state of the device.

6. The device as claimed in claim 1, wherein the processor is further configured to execute:
changing at least one rule among the one or more rules in response to a request from an information processing apparatus.

7. A data transmission method executed by a device including a memory and a processor, the method comprising:
- first determining, for a data item of a plurality of data items generated in the device, a priority for transmitting the data item of the plurality of data items, based on one or more rules set in advance, wherein at least one rule relates to a sensed state of a vehicle housing the device;
- second determining, for the data item of the plurality of data items, whether to transmit the data item, based on the priority determined for the data item of the plurality of data items; and
- transmitting one or more of the plurality of data items through a network, wherein
    - the one or more of the plurality of data items is generated in the device during a predetermined period of time,
    - the transmitting of the one or more of the plurality of data items through the network is according to a transmission order associated with respective data items of the plurality of data items,
    - the transmission order is based at least on a combination of the priority for transmitting the data item of the plurality of data items and the second determining to transmit the data item of the plurality of the data items;
    - the transmission order changes according to the state of the vehicle.

8. A non-transitory computer-readable recording medium having computer-readable instructions stored thereon, which when executed, causes a device including a memory and a processor to execute a process comprising:
- first determining, for a data item of a plurality of data items generated in the device, a priority for transmitting the data item of the plurality of data items, based on one or more rules set in advance, wherein the plurality of data items describes a state of an entity associated with the device;
- second determining, for the data item of the plurality of data items, whether to transmit the data item, based on the priority determined for the data item of the plurality of data items; and
- transmitting one or more of the plurality of data items through a network, wherein
    - the one or more of the plurality of data items is generated in the device during a predetermined period of time,
    - the transmitting of the one or more of the plurality of data items through the network is according to a transmission order associated with respective data items of the plurality of data items,
    - the transmission order is based at least on a combination of the priority for transmitting the data item of the plurality of data items and the second determining to transmit the data item of the plurality of the data items, and
    - the transmission order changes according to the state of the entity associated with the device.

* * * * *